United States Patent
Misener et al.

(10) Patent No.: US 10,609,654 B2
(45) Date of Patent: Mar. 31, 2020

(54) INDEXING CELLULAR V2X COVERAGE RANGE TO VEHICLE SPEED

(71) Applicant: QUALCOMM Incorporated, San Diego, CA (US)

(72) Inventors: James Alan Misener, Pacifica, CA (US); Jason Ellis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/452,195

(22) Filed: Mar. 7, 2017

(65) Prior Publication Data

US 2018/0132193 A1 May 10, 2018

Related U.S. Application Data

(60) Provisional application No. 62/419,859, filed on Nov. 9, 2016.

(51) Int. Cl.
*H04W 52/28* (2009.01)
*H04W 4/40* (2018.01)
(Continued)

(52) U.S. Cl.
CPC ........... *H04W 52/282* (2013.01); *H04W 4/40* (2018.02); *H04W 4/44* (2018.02); *H04W 4/46* (2018.02);
(Continued)

(58) Field of Classification Search
CPC .. H04W 52/282; H04W 4/046; H04W 52/281
(Continued)

(56) References Cited

U.S. PATENT DOCUMENTS 4,858,135 A * 8/1989 Clish .................... B60K 31/185
701/93
6,246,948 B1 * 6/2001 Thakker ........... G08G 1/096725
123/351
(Continued)

FOREIGN PATENT DOCUMENTS

EP         2688346 A1    1/2014
WO    2008104886 A2     9/2008

OTHER PUBLICATIONS

Khan M.I., "Network Parameters Impact on Dynamic Transmission Power Control in Vehicular Ad hoc Networks", International Journal of Next-Generation Networks (IJNGN), vol. 5, No. 3, Sep. 2013, pp. 1-22.
(Continued)

*Primary Examiner* — Gennadiy Tsvey
(74) *Attorney, Agent, or Firm* — Arent Fox LLP

(57) ABSTRACT

In vehicle-to-vehicle (V2V) or vehicle-to-everything (V2X) communication, the vehicle may wirelessly transmit a signal. However, transmission of a signal using a fixed transmit power may not be desirable. The transmit power should be adjusted based on various factors such as a vehicle speed and a priority level of the vehicle. The apparatus may be a device capable of wireless communication, and may be in a vehicle. The device determines one or more parameters associated with a vehicle including the device, the parameter including at least one of a speed of the vehicle or a priority level of the vehicle. The device sets a transmit power of the device based on the one or more parameters. The device transmits a message via wireless communication using the set transmit power.

24 Claims, 9 Drawing Sheets

(51) Int. Cl.
*H04W 4/46* (2018.01)
*H04W 4/44* (2018.01)
*H04W 52/38* (2009.01)

(52) U.S. Cl.
CPC ....... *H04W 52/281* (2013.01); *H04W 52/383* (2013.01)

(58) Field of Classification Search
USPC ........................................................ 455/522
See application file for complete search history.

(56) References Cited

U.S. PATENT DOCUMENTS

| | | | |
|---|---|---|---|
| 8,255,537 B2 | 8/2012 | Hamada et al. | |
| 8,265,624 B2 | 9/2012 | Guener et al. | |
| 8,682,379 B2 | 3/2014 | Hsieh et al. | |
| 2009/0176457 A1* | 7/2009 | Christensen | G01S 13/50 455/69 |
| 2010/0198459 A1* | 8/2010 | Kosai | H04W 52/267 701/36 |
| 2012/0129459 A1* | 5/2012 | Hsieh | H04W 52/282 455/66.1 |
| 2012/0238222 A1* | 9/2012 | Nakaoka | G08G 1/163 455/90.1 |
| 2014/0379250 A1* | 12/2014 | Noh | G08G 1/161 701/408 |
| 2015/0051806 A1* | 2/2015 | Kimiagar | B60T 7/128 701/93 |
| 2015/0257158 A1* | 9/2015 | Jadhav | H04W 4/90 455/404.1 |
| 2016/0027299 A1* | 1/2016 | Raamot | G08G 1/08 340/917 |
| 2016/0295624 A1 | 10/2016 | Novlan et al. | |
| 2016/0358477 A1* | 12/2016 | Ansari | G08G 1/167 |
| 2017/0048880 A1* | 2/2017 | Anderson | H04W 72/1226 |
| 2017/0219676 A1* | 8/2017 | Tran | H04W 12/02 |

OTHER PUBLICATIONS

International Search Report and Written Opinion—PCT/US2017/055787—ISA/EPO—dated Nov. 27, 2017.

* cited by examiner

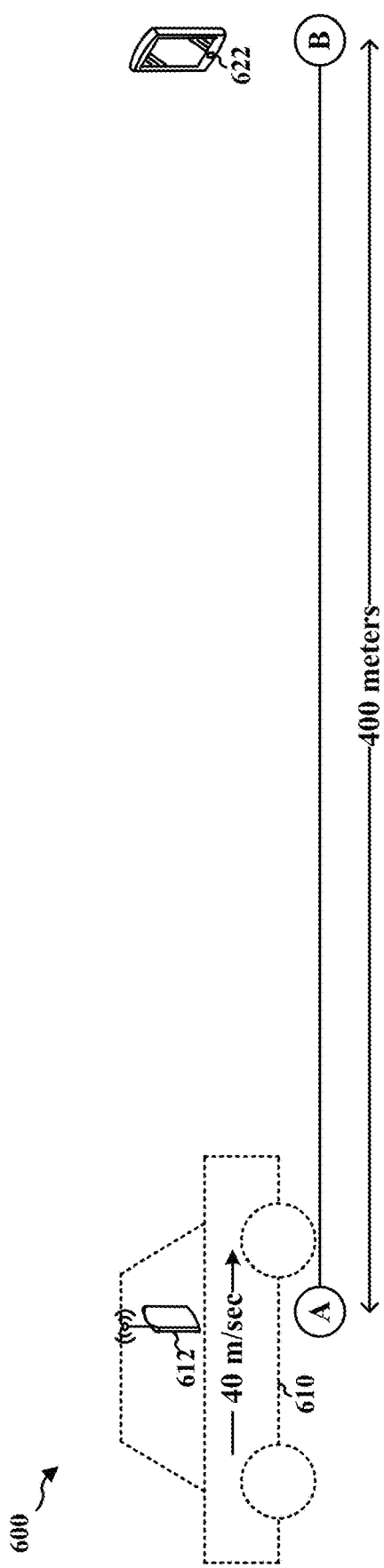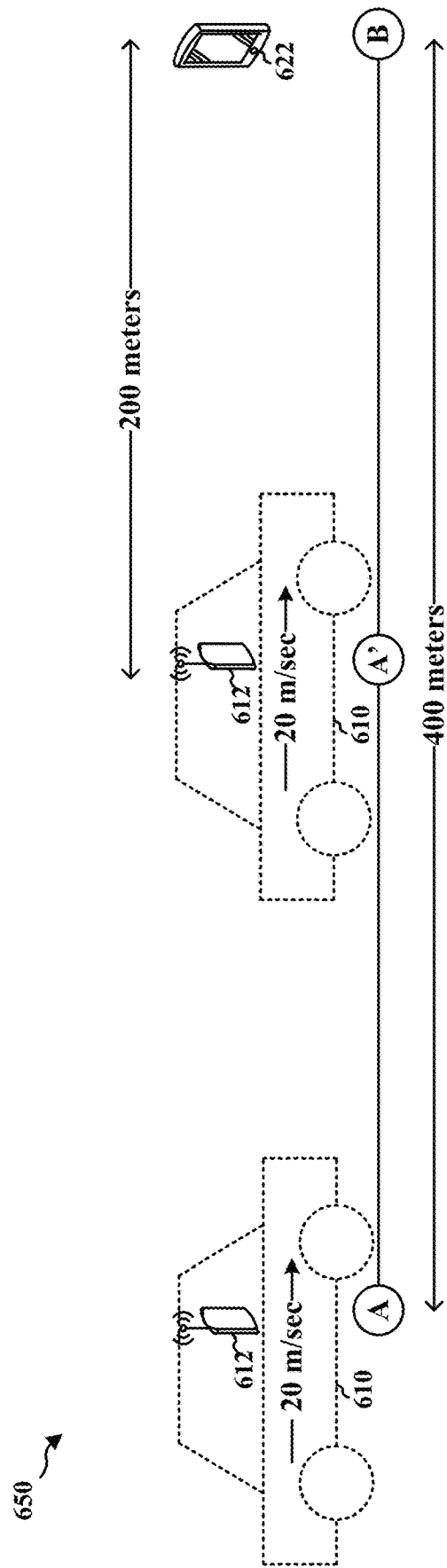
FIG. 6A
FIG. 6B

INDEXING CELLULAR V2X COVERAGE RANGE TO VEHICLE SPEED

CROSS-REFERENCE TO RELATED APPLICATION(S)

This application claims the benefit of U.S. Provisional Application Ser. No. 62/419,859, entitled "INDEXING CELLULAR V2X COVERAGE RANGE TO VEHICLE SPEED" and filed on Nov. 9, 2016, which is expressly incorporated by reference herein in its entirety.

BACKGROUND

Field

The present disclosure relates generally to communication systems, and more particularly, to a device-to-device communication involving a vehicle.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology and the introduction of 5G-new radio (NR). These improvements may also be applicable to other multi-access technologies and the telecommunication standards that employ these technologies.

Device-to-device communication has been developed to provide a way for one device to directly discover and/or communicate with another device using wireless technologies such as WiFi and LTE. The device-to-device communication has been under development in cases where communication from/to a vehicle is involved. Improvements are being continuously made in cellular device-to-device to provide reliable device-to-device communication that involves communication by a vehicle.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A vehicle may have a wireless communication capability to perform a vehicle-to-vehicle (V2V) communication or vehicle-to-everything (V2X) communication. The vehicle may transmit communication (e.g., via unicast, multicast and/or broadcast) wirelessly such that a recipient device may receive the communication. The vehicle may transmit communication with a fixed transmit power. However, using a fixed transmit power to transmit communication in all situations may not be desired. For example, different levels of transmit power may be suitable for different scenarios.

According to an aspect of the disclosure, the vehicle may adjust the transmit power for transmitting a message based on factors such as a speed of the vehicle or a priority level of the vehicle. For example, the vehicle may increase the transmit power if the speed of the vehicle becomes higher, and may decrease the transmit power if the speed of the vehicle becomes lower. For example, the vehicle may increase the transmit power if the priority level of the vehicle becomes high, and may decrease the transmit power if the priority level of the vehicle becomes low (or at a medium level).

In an aspect of the disclosure, a method, a computer-readable medium, and an apparatus are provided. The apparatus may be a device capable of wireless communication, and may be in a vehicle. The device determines one or more parameters associated with a vehicle including the device, the parameter including at least one of a speed of the vehicle or a priority level of the vehicle. The device sets a transmit power of the device based on the one or more parameters. The device transmits a message via wireless communication using the set transmit power.

In an aspect of the disclosure, the apparatus may be a device capable of wireless communication, and may be in a vehicle. The device may include means for determining one or more parameters associated with a vehicle including the device, the one or more parameters including at least one of a speed of the vehicle or a priority level of the vehicle. The device may include means for setting a transmit power of the device based on the one or more parameters. The device may include means for transmitting a message via wireless communication using the set transmit power.

In an aspect of the disclosure, the apparatus may be a device capable of wireless communication, and may be in a vehicle, where the device may include a memory and at least one processor coupled to the memory. The at least one processor may be configured to: determine one or more parameters associated with a host vehicle including the device, the one or more parameters including at least one of a speed of the host vehicle or a priority level of the host vehicle, set a transmit power of the device based on the one or more parameters, and transmit a message via wireless communication using the set transmit power.

In an aspect of the disclosure, a computer-readable medium storing computer executable code for a device, may include code to: determine one or more parameters associated with a host vehicle including the device, the one or more parameters including at least one of a speed of the host vehicle or a priority level of the host vehicle, set a transmit power of the device based on the one or more parameters, and transmit a message via wireless communication using the set transmit power.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A and 6B are example diagrams illustrating a vehicle traveling at two different speeds.

DETAILED DESCRIPTION

Figure 1:
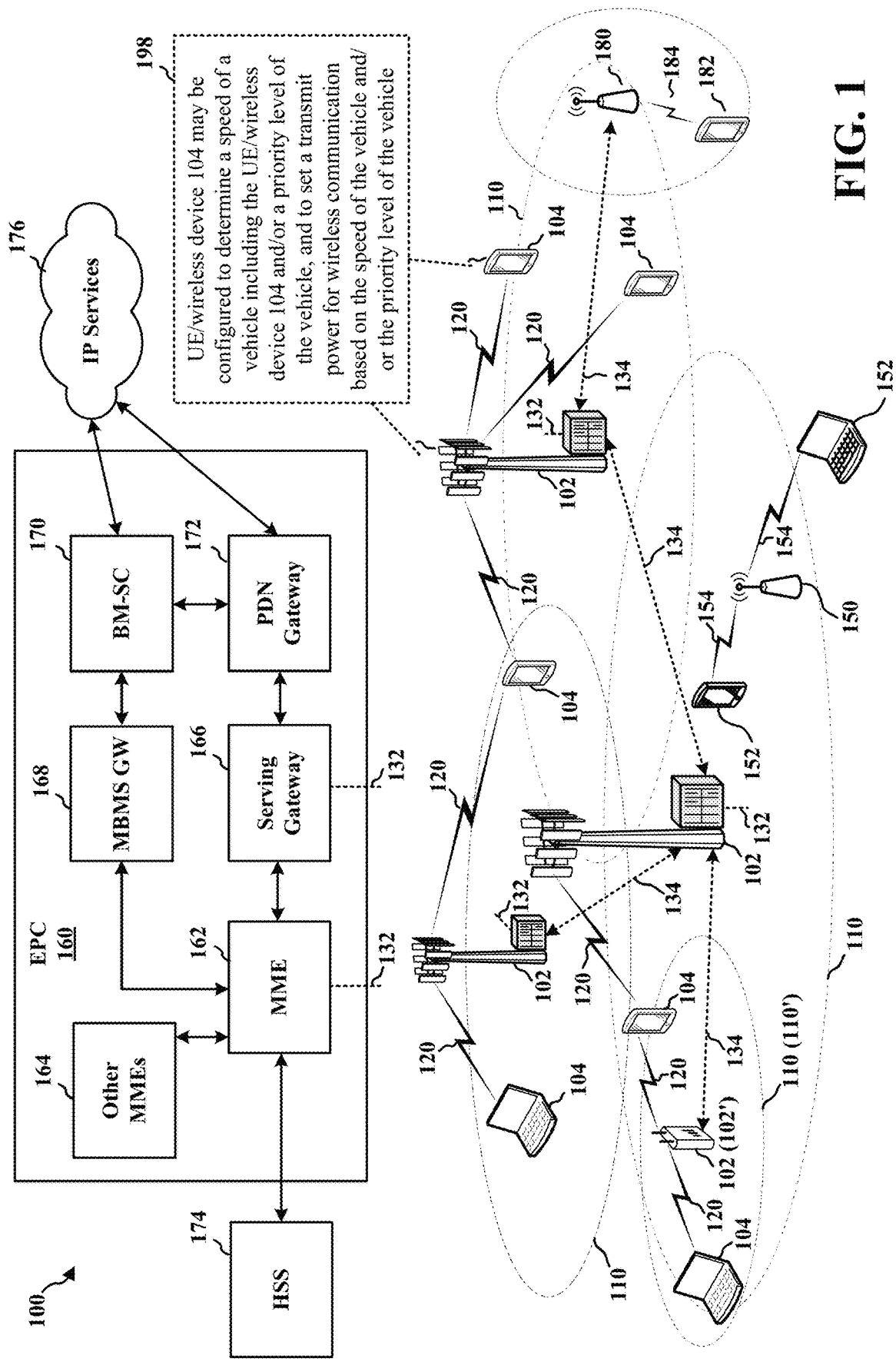
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE/wireless device 104 may be configured to determine a speed of a vehicle including the UE/wireless device 104 and/or a priority level of the vehicle, and to set a transmit power for wireless communication based on the speed of the vehicle and/or the priority level of the vehicle (198).

Figure 2A:
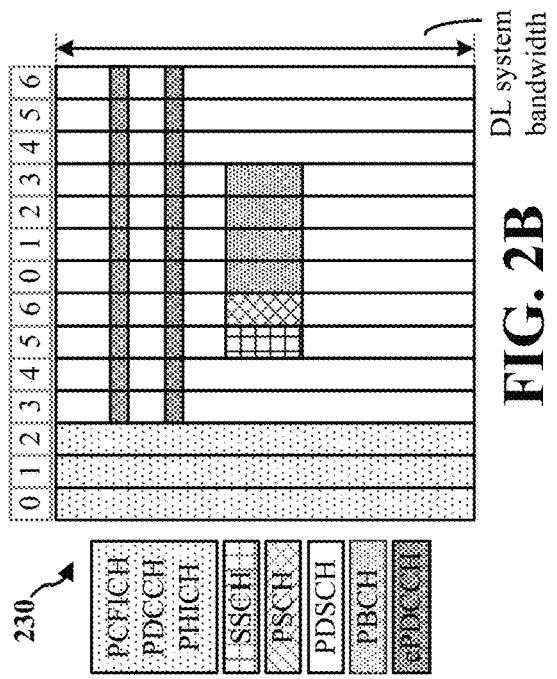
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2B:
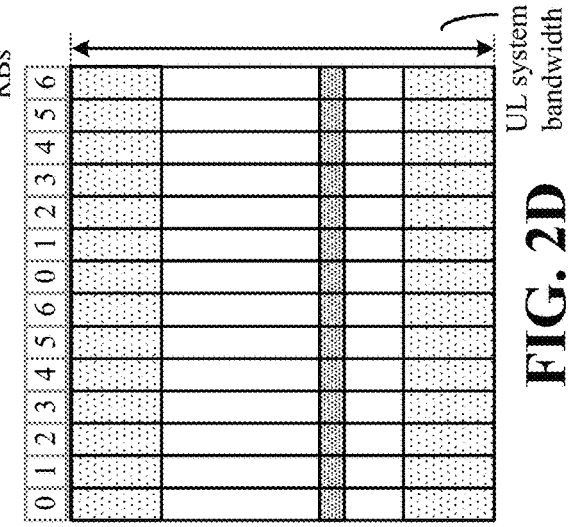
Figure 2C:
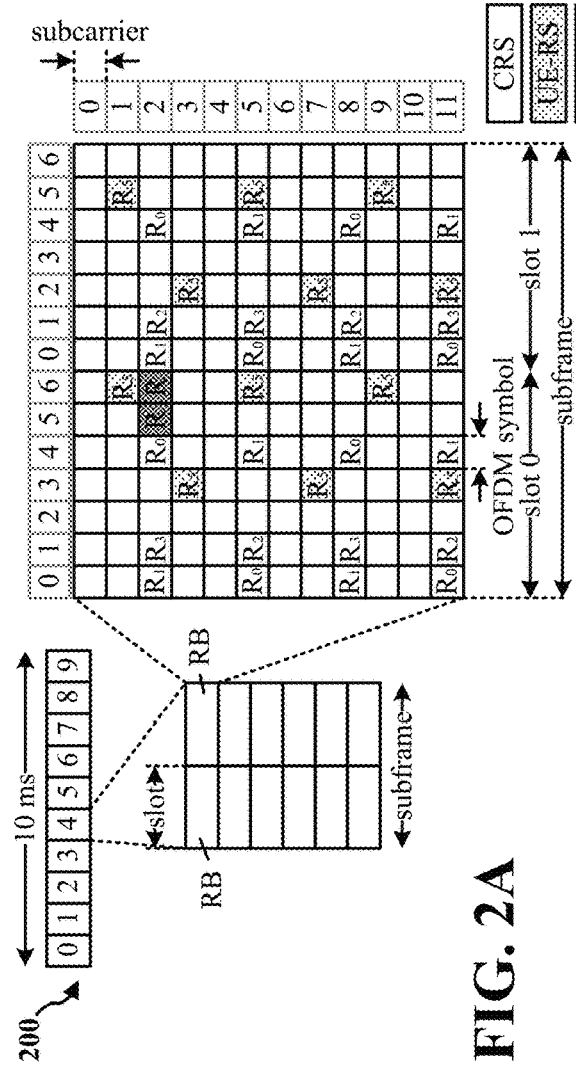
Figure 2D:
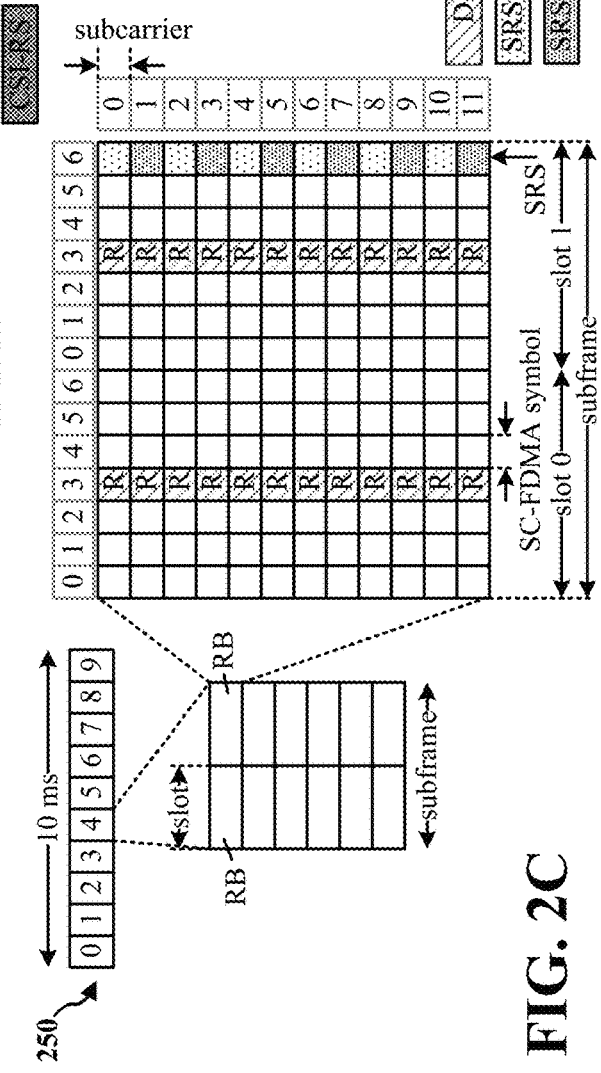

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
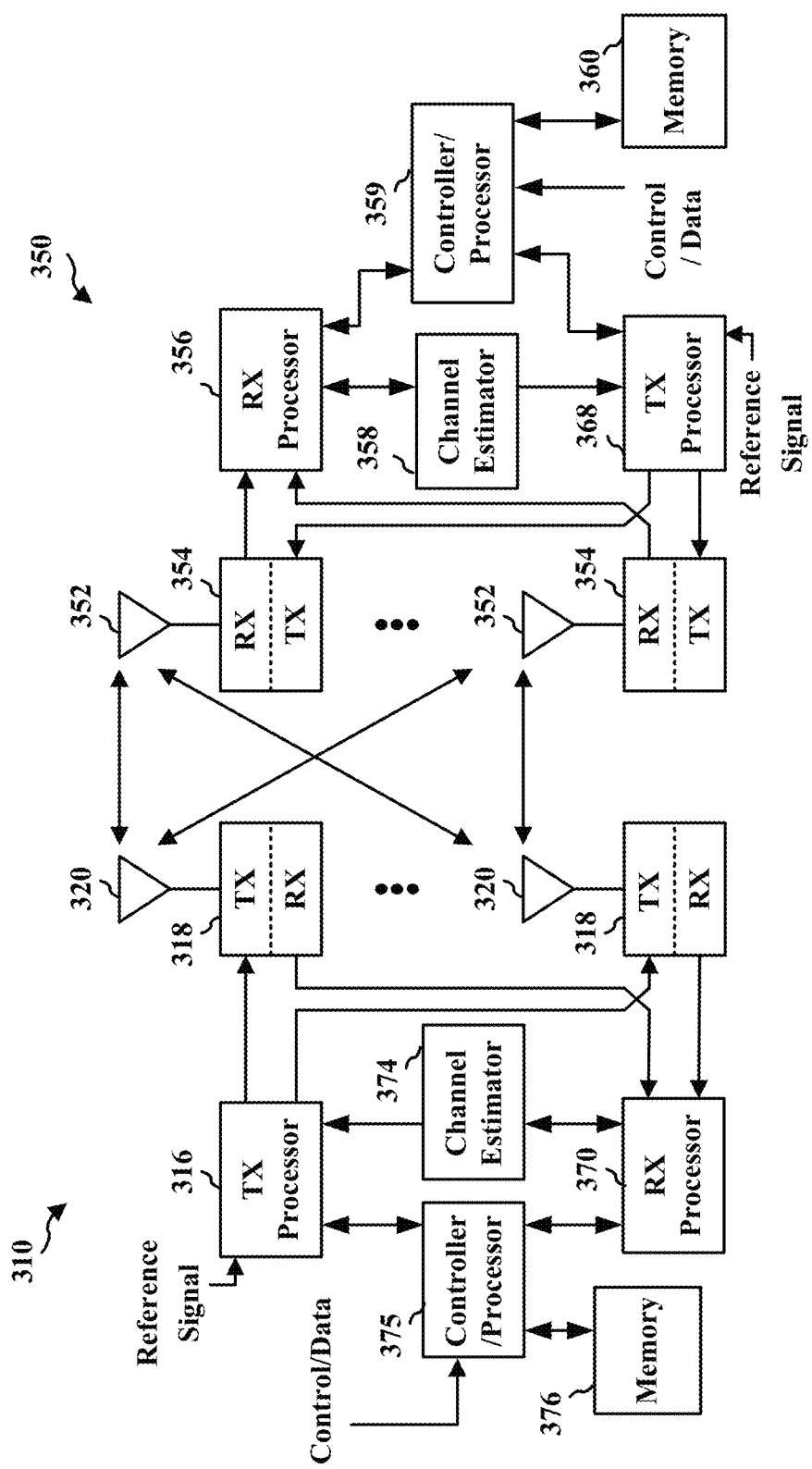
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
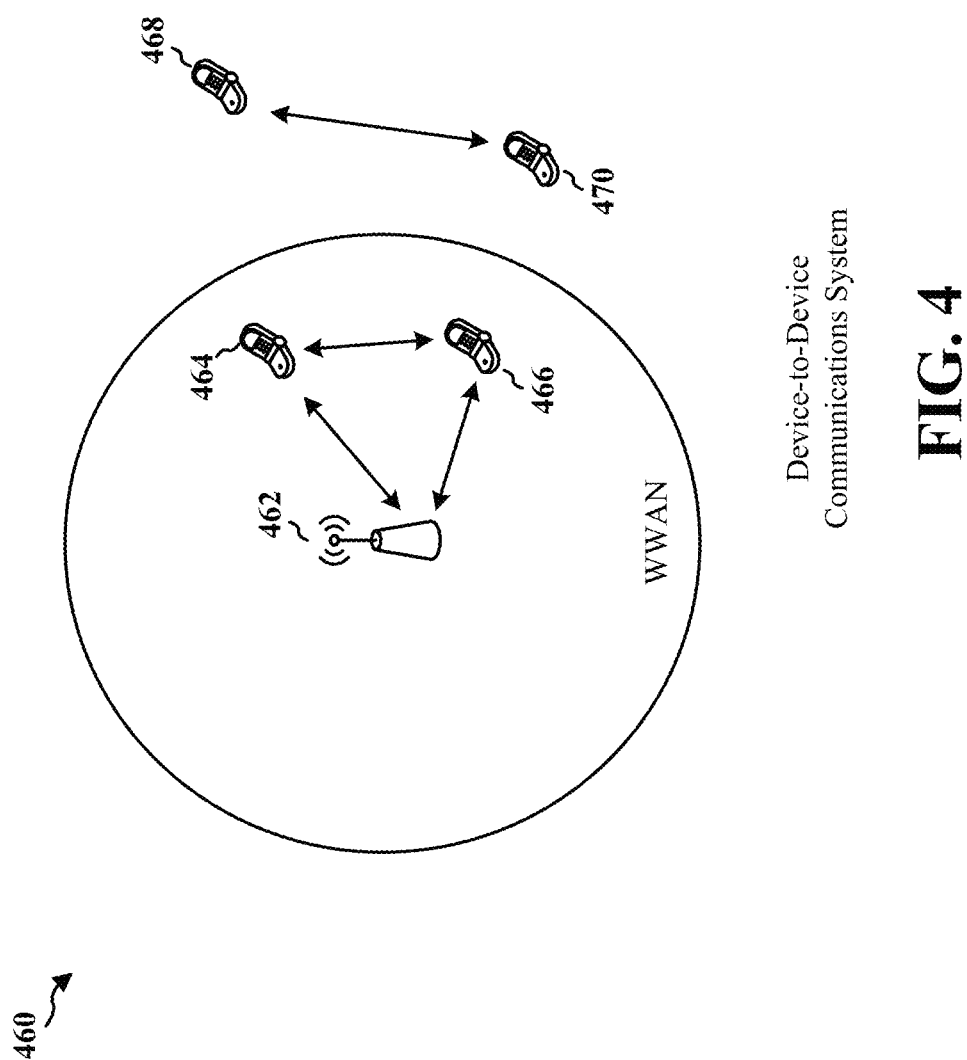
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

D2D communication may be used to provide direct communication between devices. D2D communication enables one device to communicate with another device and transmit data to the other device over allocated resources. Uses for the D2D communication may include vehicle-to-vehicle (V2V) communication and vehicle-to-everything (V2X) communication. Thus, according to the V2V communication, a first vehicle's device may perform D2D communication with another vehicle's device. According to the V2X communication, a vehicle's device may perform D2D communication with another device, regardless of whether that the device resides in a vehicle or not.

One type of communication that may be used for V2V communication is dedicated short range communication (DSRC). The DSRC is a short-range wireless communication capability, which may be based on IEEE 802.11p that is similar to Wi-Fi. In the DSRC, before transmission, a device may examine a channel. For transportation-related communications (e.g., V2X communication), 5.9 GHz unlicensed spectrum may be reserved for intelligent transportation services (ITS) communication. Recently, other types of communication such as LTE communication for V2V communication have been under development. For example, LTE direct (LTE-D) may be utilized for V2V communication, over a licensed spectrum and/or an unlicensed spectrum.

Figure 5:
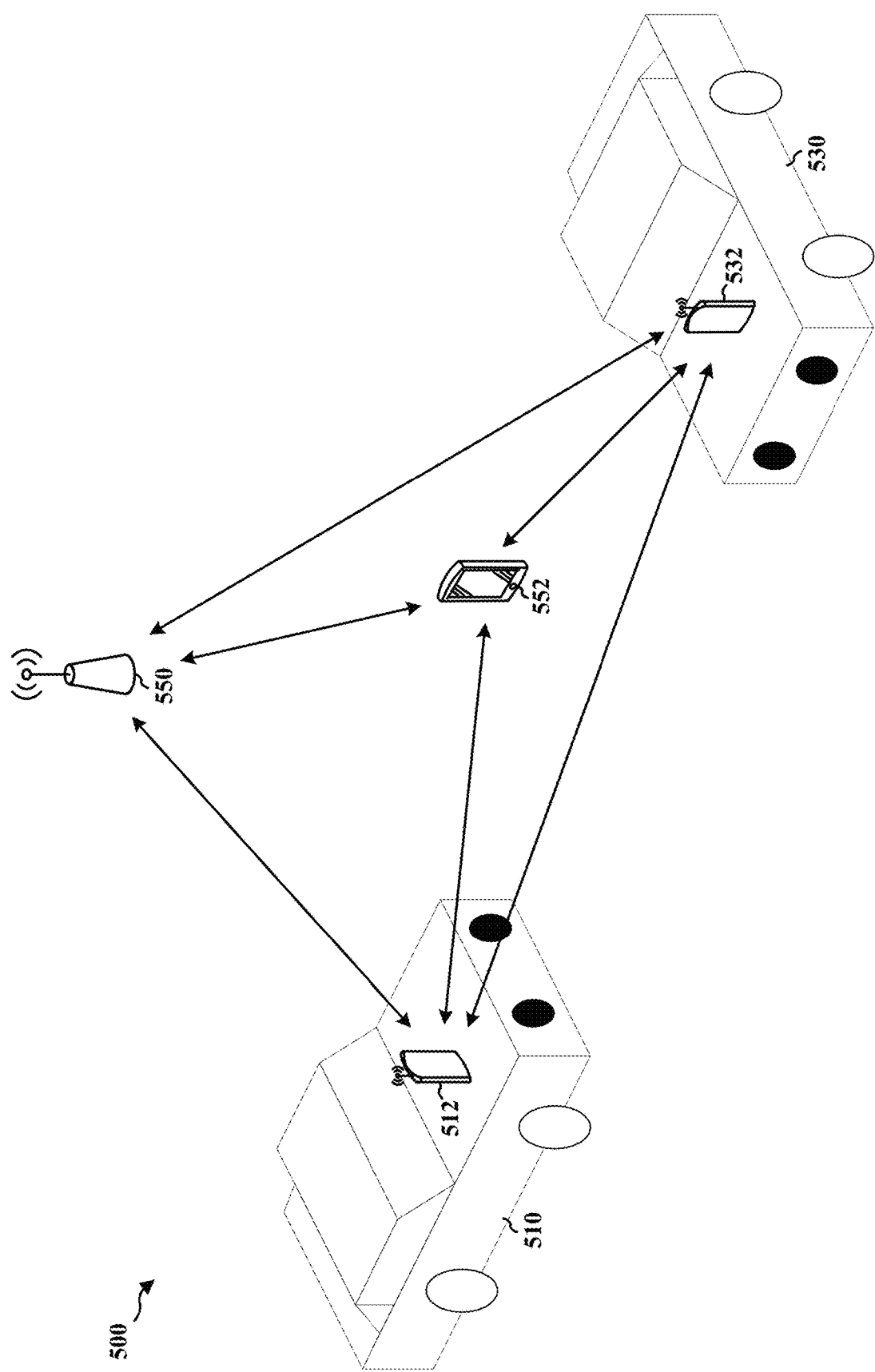
FIG. 5 is an example diagram 500 illustrating vehicle-to-vehicle communication and vehicle-to-everything communication.

FIG. 5 is an example diagram 500 illustrating V2V communication and V2X communication. A first device 512 is present in a first vehicle 510, and thus may travel with the first vehicle 510. A second device 532 may be present in a second vehicle 530, and thus may travel with the second vehicle 530. Hence, the first device 512 and the second device 532 are vehicle devices. In another aspect, the first device 512 may be present independently from the first vehicle 510 or may be a part of the first vehicle 510. The second device 532 may be present independently from the second vehicle 530, or may be a part of the second vehicle 530. The first device 512 and the second device 532 as well as a third device 552 may be connected to a base station 550. The third device 552 may be a UE and may not be a part of a vehicle. The third device 552 may be carried by a pedestrian. The first device 512 and the second device 532 may be configured to perform V2V communication with each other. The first device 512 and the third device 552 may be configured to perform V2X communication with each other. The second device 532 and the third device 552 may be configured to perform V2X communication with each other. The V2V communication and the V2X communication by the first device 512, the second device 532, and the third device 552 may be performed over LTE or a short range communication protocol such as dedicated short range communication (DSRC) based on an 802.11 protocol.

In wireless communication such as V2V or V2X communication, transmit power of a device may determine a communication range of the device, where the communication range may correspond to how far the device may reliably transmit a message. A device may increase the communication range of the device by increasing the transmit power of the device. The device may decrease the communication range of the device by decreasing the transmit power of the device. Thus, for example, a device may use a high transmit power to reach another device that is far away. Increasing the transmit power may cause more signal interference due to the high power of the transmitted signal and may cause higher battery/power consumption by the device. Therefore, transmitting at a high transmit power may not be desirable in some cases although there may be cases where a high transmit power is desirable.

If a vehicle is traveling at a high speed, the vehicle may travel a long distance within a short period of time. In other words, in a given time period, a vehicle traveling at a high speed travels a longer distance than a vehicle traveling at a low speed. Because a vehicle traveling at a high speed travels a longer distance in a given time, the vehicle traveling at the high speed may reach a certain location (e.g., destination) earlier than when the vehicle is traveling at a lower speed. Hence, a high speed vehicle may have higher interest/increased urgency to communicate with another device that is distant from the vehicle than when the vehicle is traveling at a lower speed.

A recipient device may not reliably receive a communication from a vehicle device in the vehicle until the recipient device is within a communication range of the vehicle. The communication range may be based on the transmit power of the vehicle device. For example, a vehicle device (e.g., the first device 512 or the second device 532) is in a vehicle and thus travels with the vehicle. If a vehicle device uses a fixed transmit power to send communications and the transmit power provides a communication range of 200 meters, the recipient device may not receive a communication from the vehicle device until the vehicle device is within 200 meters of the recipient device. For example, when the transmit power results in a 200 meter communication range, if the vehicle device is traveling toward the recipient device at 20 meters per second (m/sec), the recipient device may not be able to receive communication from the vehicle device until the vehicle device is 10 seconds away (e.g., 200 meters away) from the recipient device. On the other hand, with a transmit power resulting a 200 meter communication range, if the vehicle device is traveling toward the recipient device at 40 m/sec, the recipient device may not be able to receive communication from the vehicle device until the vehicle device is 5 seconds away (e.g., 200 meters away) from the recipient device. By providing a user with more time, the user of the recipient device may react with less urgency and therefore in a safer manner. For example, when the vehicle device is traveling at a higher speed (e.g., 40 m/sec) (e.g., due to the vehicle traveling at the higher speed), increasing the transmit power at the higher speed may increase the communication range and the user of the recipient device may be afforded more time to safely react to the communication from the vehicle device before the vehicle/vehicle device reaches the recipient device. Thus, increasing the transmit power of the vehicle device (e.g., thus increasing the communication range) may be beneficial when traveling at 40 m/sec such that 10 seconds of alert time is provided, instead of the 5 seconds of alert time available if the transmit power is not increased. Therefore, increasing the transmit power to provide an increased distance communication range is desired when a vehicle/vehicle device is traveling at a higher speed. Further, certain conditions may make transmitting at a higher transmit power to cover a long distance range beneficial for safety, convenience and traffic calming. Accordingly, an approach to adjust a transmit power of a vehicle device based on various factors, e.g., vehicle speed, is desired in V2V/V2X communication.

According to an aspect of the disclosure, a vehicle device in a vehicle may be configured to adjust a transmit power of the vehicle device for wireless communication based on various factors such as vehicle speed and/or a priority level of the vehicle. For example, the vehicle device may determine the speed of the vehicle based on a vehicle speedometer measurement and/or a location measurement (e.g., via a global positioning device (GPS)). For example, the vehicle device may determine the priority level of the vehicle by communicating with the vehicle having the priority level information within the vehicle or by communicating with another device that has the priority level information. The speed of the vehicle and the speed of the vehicle device may be the same or may be substantially the same because the vehicle device is included in the vehicle and thus travels with the vehicle. In an aspect, the vehicle device in the vehicle may increase the transmit power of the vehicle device if a speed of the vehicle increases. Increasing the transmit power of the vehicle device may increase the communication range of the vehicle device. A higher speed vehicle may reach a certain location in less time than a slower speed vehicle. A recipient device should receive the message transmitted from the vehicle device in the vehicle with sufficient time for a user of a recipient device to react to the message before the vehicle reaches the location of the recipient device. For example, if the vehicle device in the vehicle transmits a message indicating the presence of the vehicle, the message should reach a recipient device in time for a user of the recipient device to react to the message from the vehicle device (e.g., by moving out of the vehicle's path). As such, when the vehicle is traveling at a higher speed, the vehicle device's message should be received by the recipient device when the vehicle is farther away from the recipient device. Thus, when the vehicle is traveling at a higher speed, the vehicle device in the vehicle should use a higher transmit power to provide an increased communication range so that the transmitted message reaches the recipient device when the recipient device is farther away from the vehicle. A message transmitted at a higher power may be received by a recipient device over a greater distance. In an aspect, the vehicle device in the vehicle may decrease the transmit power of the vehicle device if a speed of the vehicle decreases. Decreasing the transmit power of the vehicle device may decrease the communication range of the vehicle device. A vehicle traveling at a lower speed takes longer to reach a recipient device than when the vehicle travels at a higher speed. Thus, even if the vehicle device in the vehicle uses a lower transmit power with a decreased communication range such that the recipient device receives the message from the vehicle device when the vehicle is closer, the recipient device and/or a user of the recipient device may still have sufficient time to react to the message before the vehicle reaches the recipient device and/or the user of the recipient device. In addition, a vehicle/vehicle device traveling at a lower speed may not be interested in communicating with devices that are distant from the vehicle device because the vehicle at the lower speed may reach distant devices at a later time (e.g., due to the lower speed) than when the vehicle travels at a higher speed. In other words, distant devices may not concern the vehicle/vehicle device that are traveling at a lower speed. Thus, when the vehicle's speed is lower, the vehicle device may use a lower transmit power because the vehicle/vehicle device may not be interested in reaching devices far from the vehicle/vehicle device. In one aspect, the vehicle device may increase the transmit power if the speed of the vehicle is above a nominal speed, and may decrease the transmit power if the speed of the vehicle is below the nominal speed. The nominal speed may be a reference speed, such as a speed limit for a certain region of a road.

In an aspect, a distance d traveled by a vehicle may be determined by the following equation:

$$d = vt + \left(\frac{1}{2}\right)at^2,$$

where v is velocity of the vehicle, t is time, and a is acceleration of the vehicle.

At a constant speed, v scales linearly with distance d since acceleration a is zero. Therefore, at constant speeds, the transmit power of a vehicle device in the vehicle may be proportional to the distance d. The transmit power in dBm may be expressed as: P(dBm)=10 log(n), where n is a communication range of the vehicle device corresponding to the transmit power of the vehicle device. For example, in a case where a nominal radiated power is 20 dBm, increasing the transmit power from 20 dBm to 23 dBm would double the communication range n. For example, decreasing the transmit power from 20 dBm to 17 dBm would reduce the communication range n by a half. The communication range n may be directly associated with the distance d per given time t because the communication range n should be increased if the vehicle travels a greater distance d per given time t due to a higher velocity v of the vehicle. Thus, according to an aspect of the disclosure, as the velocity v increases, the vehicle device may increase the communication range n of the vehicle device by increasing the transmit power of the vehicle device. For example, if the velocity v doubles, the vehicle device may determine to double the communication range n and thus increases the transmit power of the vehicle device by 3 dBm. For example, if the velocity v decreases by a half, the vehicle device may determine to decrease the communication range n by a half and thus decreases the transmit power of the vehicle device by 3 dBm. By doubling the communication range n with the increased transmit power when the velocity v doubles, the message transmitted by the vehicle device may reach the recipient device x seconds before the vehicle reaches the location of the recipient device. Further, with the communication range n being reduced by one half with the decreased transmit power when the velocity is reduced by one half, the message transmitted by the vehicle device may reach the recipient device x seconds before the vehicle reaches the location of the recipient device. Thus, by adjusting the transmit power based on the velocity v to adjust the communication range n, the amount of time that the recipient device has before the vehicle reaches the location of the recipient device may stay constant (e.g., at sufficient time for the user of the recipient device to respond before the vehicle reaches the user/recipient device). Hence, the velocity v may be perceived as a variable parameter. In an aspect, the relationship between certain velocities and corresponding transmit power values may be indexed. In one example, if the transmit power of 20 dBm is configured for a vehicle traveling at 30 msec, the vehicle device may set the transmit power to be 17 dBm if the speed of the vehicle is 15 msec and may set the transmit power to be 23 dBm if the speed of the vehicle is 60 msec. In such an example, the amount of time for a message from the vehicle device to reach the recipient device may stay approximately constant by adjusting the transmit power to adjust the communication range.

FIGS. 6A and 6B are example diagrams illustrating a vehicle traveling at two different speeds. In the example diagrams of FIGS. 6A and 6B, a vehicle device in the vehicle should notify a recipient device of the vehicle's presence at least 10 seconds in advance of the vehicle reaching the recipient device to provide a user of the recipient device sufficient time to safely react to the message (e.g., with less urgency). FIG. 6A is an example diagram 600 illustrating a vehicle traveling at a high speed. In the example diagram 600, a vehicle 610 with a vehicle device 612 for V2X or V2V communication travels at 40 msec. If a UE 622 at point B is 400 meters away from the vehicle 610 at point A, the vehicle 610 traveling at 40 msec would take 10 seconds to reach the UE 622. Thus, if the vehicle device 612 should notify the UE 622 at least 10 seconds in advance before the vehicle 610 reaches the UE 622, the vehicle device 612 of the vehicle 610 should use sufficient transmit power to transmit the message such that the message reliably reaches the UE 622 that is 400 meters away from the vehicle 610. In another scenario, the vehicle 610 may travel at a lower speed. FIG. 6B is an example diagram 650 illustrating a vehicle traveling at a low speed. The vehicle 610 in the example diagram 600 travels at 20 msec, and thus travels more slowly in the example diagram 650 than in the example diagram 600. If the UE 622 at point B is 400 meters away from the vehicle 610 at point A, the vehicle 610 traveling at 20 msec would take 20 seconds to reach the UE 622. Over time, the vehicle 610 reaches point A' that is 200 meters away from the UE 622. At point A', the vehicle 610 traveling at 20 msec would reach the UE 622 in 10 seconds. Thus, if the vehicle device 612 should notify the UE 622 at least 10 seconds in advance before the vehicle 610 reaches the UE 622, the vehicle device 612 of the vehicle 610 traveling at 20 msec should use sufficient transmit power to transmit the message such that the message reliably reaches the UE 622 that is 200 meters away from the vehicle 610. The transmit power needed to reach the UE 622 that is 400 meters away is higher than the transmit power needed to reach the UE 622 that is 200 meters away. Thus, when the vehicle 610 travels at 40 msec, the vehicle device 612 transmits with higher transmit power to reach another device as far as 400 meters away, whereas when the vehicle 610 travels at 20 msec, the vehicle device 612 transmits with a lower transmit power to reach another device located as far as 200 meters away. Hence, when the vehicle 610 travels at 40 msec, the transmit power by the vehicle device 612 may be +3 dBm higher than the transmit power used for the vehicle speed of 20 msec.

In an aspect, if there is an acceleration a by the vehicle, the acceleration may affect the velocity v and the distance d. In an aspect, for simplicity, even if the vehicle has an acceleration a, the vehicle device in the vehicle may consider the velocity v of the vehicle and may not consider the acceleration a because the acceleration a of a vehicle may be small (e.g., less than 1 m/sec²). For example, based on the inverse-square law, if the equation $$d = vt + \left(\frac{1}{2}\right)at^2$$

is squared at both sides to provide a constant gain (dBm), solving for the distance d results in the following equation.

$$d = \sqrt{(v^2)(t^2) + av(t)^3 + \left(\frac{1}{4}\right)(a^2)(t^4)}$$

A vehicle may decelerate at 0.2 m/sec² and may accelerate with an acceleration of less than 0.2 m/sec². When the acceleration is small, the second term $av(t)^3$ and the third term $$\left(\frac{1}{4}\right)(a^2)(t^4)$$

result in a small value that has little effect on the distance d. Thus, for simplicity, in an aspect, the acceleration a may not be considered but the velocity v may be considered in determining the distance d and the transmit power in dBm.

In another aspect, the vehicle may consider an acceleration in a step-wise approach. In particular, if the vehicle accelerates to reach a velocity that is greater than or equal to a first threshold velocity and is less than a second threshold velocity, the vehicle device in the vehicle may use the first threshold velocity as the vehicle velocity v to determine the transmit power. If the vehicle achieves the first threshold velocity and continues to accelerate, the vehicle device in the vehicle may predict based on the acceleration that a next threshold velocity will be achieved within a set time. If the vehicle achieves the next threshold velocity within the set time, then the vehicle device in the vehicle uses the next threshold velocity as the vehicle velocity v to determine the transmit power. If the vehicle does not achieve the next threshold velocity within the set time, the vehicle device in the vehicle uses the first threshold velocity as the vehicle velocity v to determine the transmit power. Thus, instead of constantly changing the transmit power with the changing velocity, the vehicle device may be configured to adjust the transmit power in the step-wise approach based on various threshold velocities.

In an aspect, the vehicle device in the vehicle may increase the transmit power (e.g., to a high transmit power) when a priority level of the vehicle is high, and may decrease the transmit power (e.g., to a low or normal transmit power) when the priority level of the vehicle is low and/or as part of a battery conservation mode (e.g., to extend operating time of the vehicle device). For example, a vehicle with a high priority such as an ambulance or a police car may have an increased interest/increased urgency to reach recipient devices even from a distant location, and thus may use an increased transmit power. In an aspect, the vehicle device may determine that the priority level is high if the priority level is above a priority threshold, and may determine that the priority level is low if the priority level is below the priority threshold. The vehicle device in the vehicle may determine the priority level based on one or more factors including a type of the vehicle, a mission of the vehicle, or a threat level of the vehicle to at least one of another vehicle or a person. For example, if the vehicle device determines that the type of the vehicle that includes the vehicle device is an emergency vehicle (e.g., an ambulance car), a police car, or a public transportation vehicle (e.g., a bus, a train, etc.), the vehicle may set the priority level to high. Otherwise, the vehicle device may set the priority level to low. For example, if the vehicle device determines that a mission of the vehicle that includes the vehicle device is high (e.g., transporting the President of the United States to a destination), the vehicle device may set the priority level to high. For example, if the threat level of the vehicle is high, the vehicle device in the vehicle may set the priority level high. The vehicle device (or another device) may determine that the threat level of the vehicle including the vehicle device is high if the vehicle is traveling in a wrong direction (e.g., in a direction opposite to a travel direction of a lane), and/or if the vehicle is near an intersection, and/or if the vehicle is a stolen vehicle. In an aspect, the priority level may be determined based on aggregation of priority values of different factors. For example, if the public-transportation vehicle type corresponds to a priority value of 2 and a high threat level corresponds to a priority value of 5, the priority level may be the aggregate of the two priority values, which is 5. Thus, for example, if the priority threshold is 3, the vehicle device may determine that the priority level is high and thus may increase the transmit power. In an aspect, each condition may be assigned with a priority level, and each priority level may correspond to a certain transmit power. Thus, the vehicle device may set the transmit power to be higher when the priority level is 7 than when the priority level is 5.

In an aspect, if the channel used by the vehicle device in the vehicle to transmit a message is congested (e.g., based on a channel busy ratio), the vehicle device may not increase the transmit power of the vehicle device unless an overriding factor exists. For example, if the channel used by the vehicle device to transmit the message is congested, the vehicle device may not increase the transmit power of the vehicle device beyond a nominal transmit power. The nominal transmit power may be an upper limit on the transmit power of the vehicle device when the channel used for transmission is congested. In an aspect, if an overriding factor exists, the vehicle device may be configured to override a channel busy protocol based on the channel busy ratio, and may increase the transmit power (e.g., beyond the nominal transmit power) even if the channel is congested (e.g., based on a channel busy ratio). On the other hand, if the vehicle device determines that no overriding factor exists, the vehicle device may not increase the transmit power of the vehicle device above a nominal transmit power if the channel is congested.

The overriding factor may be associated with one or more of the factors that determine the priority level. If a priority level is high due to one or more specific cases, the overriding factor exists and thus the vehicle device may increase the transmit power even when the channel is busy. For example, the vehicle device may be configured to override the channel busy protocol if the vehicle type of the vehicle including the vehicle device is an emergency vehicle corresponding to a high priority level, but the vehicle device may be configured to consider the channel busy protocol when setting transmit power for other cases (e.g., for cases involving a vehicle with a lower priority level). In such an example, if the vehicle type is an emergency vehicle moving with emergency lights and sirens according to an emergency response such that the priority level is high, the vehicle device in the vehicle may increase the transmit power even if the channel is congested, but if the vehicle type is a normal vehicle that corresponds to a low priority level, the vehicle device may not increase the transmit power if the channel is busy.

Figure 7:
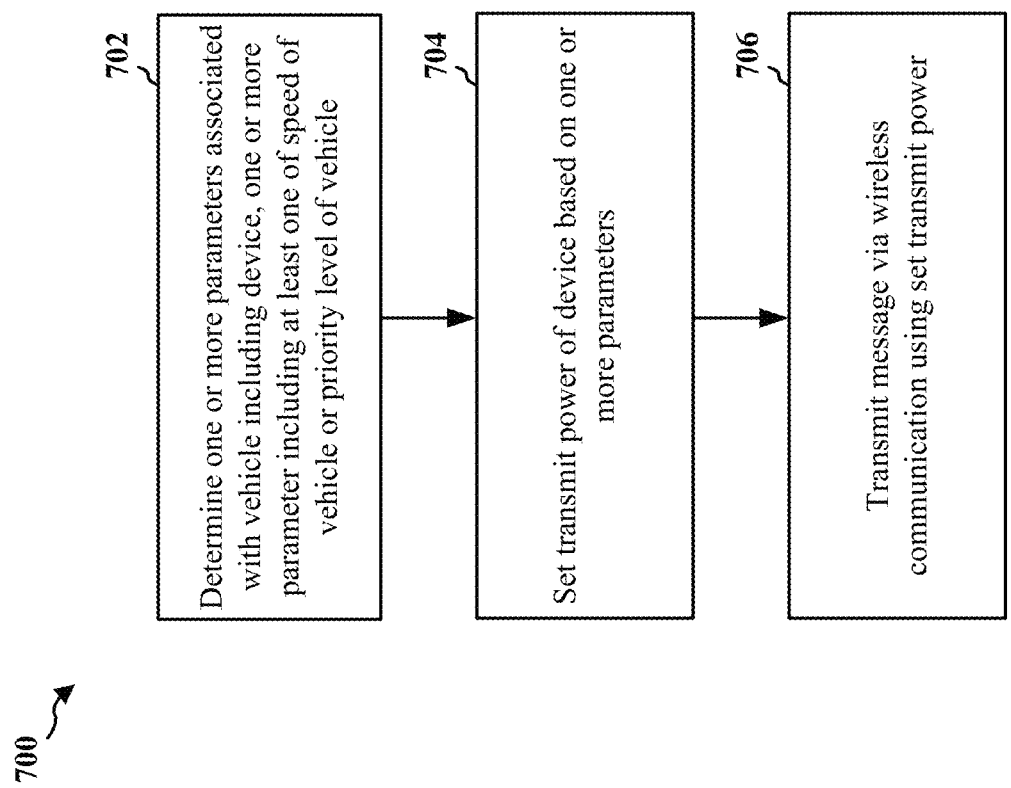
FIG. 7 is a flowchart of a method of managing transmit power for wireless communication.

FIG. 7 is a flowchart 700 of a method of managing transmit power for wireless communication. The method may be performed by a device (e.g., the first device 512, the vehicle device 612, the apparatus 802/802'). In an aspect, the wireless communication may be at least one of device-to-device communication or vehicle-to-vehicle communication. At 702, the device determines one or more parameters associated with a vehicle including the device, the parameter including at least one of a speed of the vehicle or a priority level of the vehicle. For example, as discussed supra, the vehicle device in the vehicle may consider a speed of the vehicle and/or a priority level of the vehicle. At 704, the device sets a transmit power of the device based on the one or more parameters. For example, as discussed supra, the vehicle device may set the transmit power of the vehicle device based on the speed of the vehicle and/or the priority level of the vehicle. In an aspect, increasing the transmit power increases a communication range of the device and decreasing the transmit power decreases the communication range of the device. For example, as discussed supra, increasing the transmit power of the vehicle device may increase the communication range of the vehicle device and decreasing the transmit power of the vehicle device may decrease the communication range of the vehicle device.

In an aspect, the device may set the transmit power by: increasing the transmit power if the speed of the host vehicle increases, and decreasing the transmit power if the speed of the host vehicle decreases. For example, as discussed supra, the vehicle device in the vehicle may increase the transmit power of the vehicle device if a speed of the vehicle increases. For example, as discussed supra, the vehicle device in the vehicle may decrease the transmit power of the vehicle device if a speed of the vehicle decreases.

In an aspect, the device may set the transmit power by: increasing the transmit power if the speed of the host vehicle is above a nominal speed, and decreasing the transmit power if the speed of the host vehicle is below the nominal speed. For example, as discussed supra, the vehicle device may increase the transmit power if the speed of the vehicle is above a nominal speed, and may decrease the transmit power if the speed of the vehicle is below the nominal speed. In such an aspect, the nominal speed is based on a speed limit associated with the host vehicle. For example, as discussed supra, the nominal speed may be a reference speed, such as a speed limit for a certain region of a road.

In an aspect, the device may set the transmit power by: refraining from increasing the transmit power to a power greater than a nominal power if a channel used to transmit a message is at a busy level. For example, as discussed supra, if the channel used by the vehicle device to transmit the message is congested, the vehicle device may not increase the transmit power of the vehicle device above a nominal transmit power.

In an aspect, the device may set the transmit power by: determining whether an overriding factor exists, increasing the transmit power if a channel used to transmit a message is at a busy level and if the overriding factor exists, and refraining from increasing the transmit power to a power greater than the nominal power if the channel used to transmit the message is at the busy level and if the overriding factor does not exist. In such an aspect, the overriding factor exists when the priority level is at or above a threshold level. For example, as discussed supra, if the channel used by the vehicle device in the vehicle to transmit a message is congested (e.g., based on a channel busy ratio), the vehicle device may not increase the transmit power of the vehicle device unless an overriding factor exists. For example, as discussed supra, if an overriding factor exists, the vehicle device may be configured to override a channel busy protocol based on the channel busy ratio, and may increase the transmit power (e.g., beyond the nominal transmit power) even if the channel is congested. On the other hand, as discussed supra, if the vehicle device determines that no overriding factor exists, the vehicle device may not increase the transmit power of the vehicle device beyond a nominal transmit power if the channel is congested. For example, as discussed supra, the overriding factor may be associated with one or more of the factors that determine the priority level.

In an aspect, the device may set the transmit power by: setting the transmit power to a high power if the priority level is at or above a threshold level, and setting the transmit power to a nominal power if the priority level is below the threshold level. For example, as discussed supra, the vehicle device in the vehicle may increase the transmit power (e.g., to a high transmit power) when a priority level of the vehicle is high, and may decrease the transmit power (e.g., to a low or normal transmit power) when the priority level of the vehicle is low. For example, as discussed supra, the vehicle device may determine that the priority level is high if the priority level is above a priority threshold, and may determine that the priority level is low if the priority level is below the priority threshold. In such an aspect, the device may determine the one or more parameters by determining the priority level of the host vehicle based on at least one of a type of the host vehicle, a mission of the host vehicle, or a threat level of the host vehicle to at least one of another vehicle or a person. For example, as discussed supra, the vehicle device in the vehicle may determine the priority level based on one or more factors including a type of the vehicle, a mission of the vehicle, or a threat level of the vehicle to at least one of another vehicle or a person. In such an aspect, the high priority vehicle type includes at least one of an emergency vehicle, a police vehicle, or a public transportation vehicle. For example, as discussed supra, if the vehicle device determines that the type of the vehicle that includes the vehicle device is an emergency vehicle (e.g., an ambulance car) or a police car, or a public transportation vehicle (e.g., a bus, a train, etc.), the vehicle may set the priority level to high. In an aspect, the priority level of the host vehicle is determined to be above the threshold level if the mission of the host vehicle is a high priority mission. For example, as discussed supra, if the vehicle device determines that a mission of the vehicle that includes the vehicle device is high (e.g., transporting the President of the United States to a destination), the vehicle device may set the priority level to high.

In an aspect, the priority level of the host vehicle is determined to be above the threshold level if the threat level of the host vehicle is a high threat level. For example, as discussed supra, if the threat level of the vehicle is high, the vehicle device in the vehicle may set the priority level high. In such an aspect, the threat level is a high threat level if the host vehicle is traveling in an opposite direction to a direction of a travel lane. In such an aspect, the threat level is a high threat level if the host vehicle is determined to be a stolen vehicle. For example, as discussed supra, the vehicle device may determine that the threat level of the vehicle including the vehicle device is high if the vehicle is traveling in a wrong direction (e.g., in a direction opposite to a travel direction of a lane), and/or if the vehicle is near an intersection, and/or if the vehicle is a stolen vehicle.

In an aspect, the speed of the host vehicle is determined based on an acceleration of the host vehicle. For example, as discussed supra, if there is an acceleration a by the vehicle, the acceleration may affect the velocity v and the distance d. In such an aspect, the device sets the transmit power further based on a first threshold speed if the speed of the host vehicle increases based on the acceleration to be greater than or equal to the first threshold speed and less than a second threshold speed, the second threshold speed being greater than the first threshold speed. For example, as discussed supra, if the vehicle accelerates to reach a velocity that is greater than or equal to a first threshold velocity and is less than a second threshold velocity, the vehicle device in the vehicle may use the first threshold velocity as the vehicle velocity v to determine the transmit power. In such an aspect, the device sets the transmit power further based on the second threshold speed if the speed of the host vehicle increases based on the acceleration to be greater than or equal to the second threshold speed within a predetermined time, and the device sets the transmit power further based on the first threshold speed if the speed of the host vehicle has not reached the second threshold speed within the predetermined time. For example, as discussed supra, if the vehicle achieves the next threshold velocity within the set time, then the vehicle device in the vehicle uses the next threshold velocity as the vehicle velocity v to determine the transmit power. For example, as discussed supra, if the vehicle does not achieve the next threshold velocity within the set time, the vehicle device in the vehicle uses the first threshold velocity as the vehicle velocity v to determine the transmit power.

At 706, the device transmits a message via wireless communication using the set transmit power. For example, as discussed supra, the vehicle device transmits a message using the transmit power set by the vehicle device.

Figure 8:
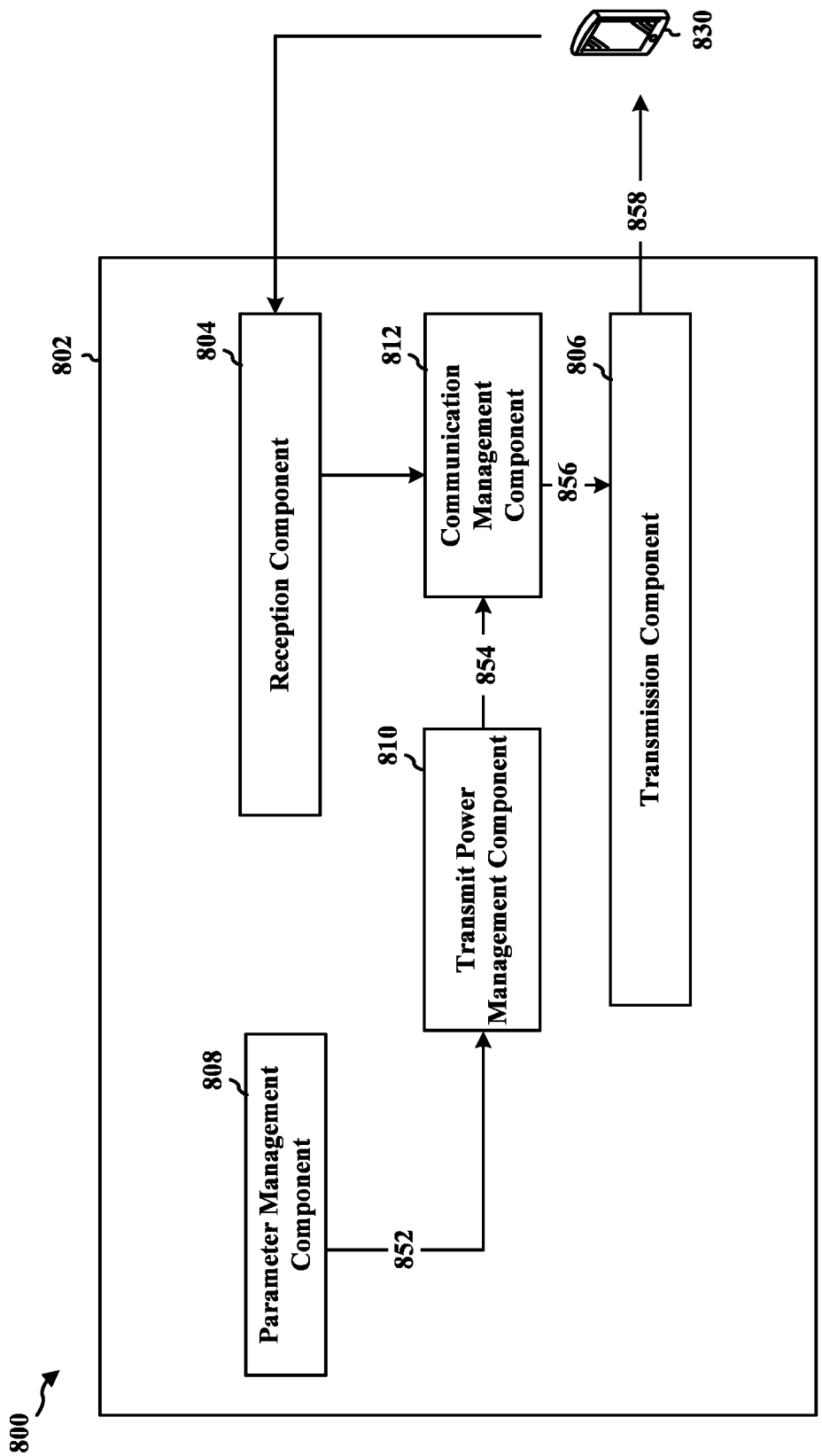
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a device capable of wireless communication, and may be in a vehicle. In an aspect, the wireless communication may be at least one of device-to-device communication or vehicle-to-vehicle communication. The apparatus includes a reception component 804, a transmission component 806, a parameter management component 808, a transmit power management component 810, and a communication management component 812.

The parameter management component 808 determines one or more parameters associated with a vehicle including the device, the parameter including at least one of a speed of the vehicle or a priority level of the vehicle. The parameter management component 808 may forward the information about the one or more parameters to the transmit power management component 810, at 852. The transmit power management component 810 sets a transmit power of the device based on the one or more parameters. In an aspect, increasing the transmit power increases a communication range of the device and decreasing the transmit power decreases the communication range of the device. The transmit power management component 810 may forward information about the transmit power of the device to the communication management component 812, at 854.

In an aspect, the transmit power management component 810 may set the transmit power by: increasing the transmit power if the speed of the host vehicle increases, and decreasing the transmit power if the speed of the host vehicle decreases.

In an aspect, the transmit power management component 810 may set the transmit power by: increasing the transmit power if the speed of the host vehicle is above a nominal speed, and decreasing the transmit power if the speed of the host vehicle is below a nominal speed. In such an aspect, the nominal speed is based on a speed limit associated with the host vehicle.

In an aspect, the transmit power management component 810 may set the transmit power by: refraining from increasing the transmit power to a power greater than a nominal power if a channel used to transmit a signal is at a busy level.

In an aspect, the transmit power management component 810 may set the transmit power by: determining whether an overriding factor exists, increasing the transmit power if a channel used to transmit a signal is at a busy level and if the overriding factor exists, and refraining from increasing the transmit power to a power greater than a nominal power if the channel used to transmit the signal is at the busy level and if the overriding factor does not exist. In such an aspect, the overriding factor exists when the priority level is at or above a threshold level.

In an aspect, the transmit power management component 810 may set the transmit power by: setting the transmit power to a high power if the priority level is at or above a threshold level, and setting the transmit power to a nominal power if the priority level is below the threshold level. In such an aspect, the device may determine the one or more parameters by determining the priority level of the host vehicle based on at least one of a type of the host vehicle, a mission of the host vehicle, or a threat level of the host vehicle to at least one of another vehicle or a person. In such an aspect, the high priority vehicle type includes at least one of an emergency vehicle, a police vehicle, or a public transportation vehicle. In an aspect, the priority level of the host vehicle is determined to be above the threshold level if the mission of the host vehicle is a high priority mission. In an aspect, the priority level of the host vehicle is determined to be above the threshold level if the threat level of the host vehicle is a high threat level. In such an aspect, the threat level is a high threat level if the host vehicle is traveling in an opposite direction to a direction of a travel lane. In such an aspect, the threat level is a high threat level if the host vehicle is determined to be a stolen vehicle.

In an aspect, the speed of the host vehicle is determined based on an acceleration of the host vehicle. In such an aspect, the device sets the transmit power further based on a first threshold speed if the speed of the host vehicle increases based on the acceleration to be greater than or equal to the first threshold speed and less than a second threshold speed, the second threshold speed being greater than the first threshold speed. In such an aspect, the device sets the transmit power further based on the second threshold speed if the speed of the host vehicle increases based on the acceleration to be greater than or equal to the second threshold speed within a predetermined time, and the device sets the transmit power further based on the first threshold speed if the speed of the host vehicle has not reached the second threshold speed within the predetermined time.

The communication management component 812 transmits, via the transmission component 806, a signal via wireless communication using the set transmit power, at 856 and 858 (e.g., to a UE 830). The communication management component 812 may receive, via the reception component 804, a signal from the UE 830.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
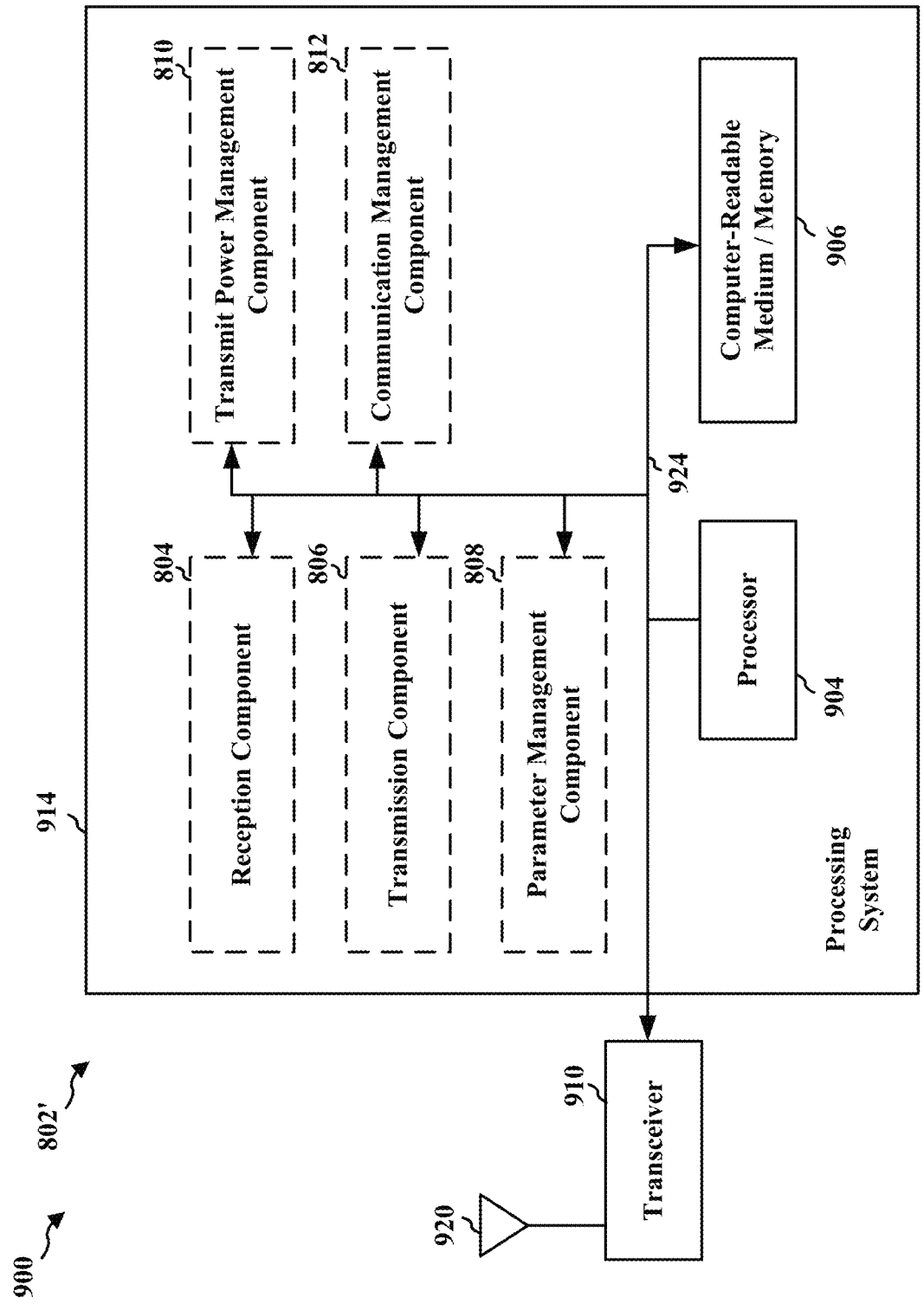
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining one or more parameters associated with a host vehicle including the apparatus 802/802', the parameter including at least one of a speed of the host vehicle or a priority level of the host vehicle, means for setting a transmit power of the apparatus 802/802' based on the one or more parameters, and means for transmitting a signal via wireless communication using the set transmit power. In an aspect, the means for setting the transmit power is configured to: increase the transmit power if the speed of the host vehicle increases, and decrease the transmit power if the speed of the host vehicle decreases. In an aspect, the means for setting the transmit power is configured to: increase the transmit power if the speed of the host vehicle is above a nominal speed, and decrease the transmit power if the speed of the host vehicle is below a nominal speed. In an aspect, the means for setting the transmit power is configured to refrain from increasing the transmit power to a power greater than a nominal power if a channel used to transmit a signal is at a busy level. In an aspect, the means for setting the transmit power is configured to: determine whether an overriding factor exists, increase the transmit power if a channel used to transmit a signal is at a busy level and if the overriding factor exists, and refrain from increasing the transmit power to a power greater than a nominal power if the channel used to transmit the signal is at the busy level and if the overriding factor does not exist. In an aspect, the means for setting the transmit power is configured to: set the transmit power to a high power if the priority level is at or above a threshold level, and set the transmit power to a nominal power if the priority level is below the threshold level. In an aspect, the means for determining the one or more parameters is further configured to determine the priority level of the host vehicle based on at least one of a type of the host vehicle, a mission of the host vehicle, or a threat level of the host vehicle to at least one of another vehicle or a person. In an aspect where the speed of the host vehicle is determined based on an acceleration of the host vehicle, the means for setting the transmit power is configured to set the transmit power further based on a first threshold speed if the speed of the host vehicle increases based on the acceleration to be greater than or equal to the first threshold speed and less than a second threshold speed, the second threshold speed being greater than the first threshold speed. In such an aspect, the means for setting the transmit power is configured to set the transmit power further based on the second threshold speed if the speed of the host vehicle increases based on the acceleration to be greater than or equal to the second threshold speed within a predetermined time, and is configured to set the transmit power further based on the first threshold speed if the speed of the host vehicle has not reached the second threshold speed within the predetermined time.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of managing transmit power for wireless communication by a device, comprising:
   determining one or more parameters associated with a host vehicle including the device, the one or more parameters including a speed of the host vehicle and a priority level of the host vehicle;
   setting a transmit power of the device based on the determined speed and priority level of the host vehicle; and
   transmitting a message via wireless communication using the set transmit power;
   wherein the speed of the host vehicle is determined based on an acceleration of the host vehicle;
   wherein the setting the transmit power is further based on a first threshold speed if the speed of the host vehicle increases based on the acceleration to be greater than or equal to the first threshold speed and less than a second threshold speed, the second threshold speed being greater than the first threshold speed;
   wherein the setting the transmit power is further based on the second threshold speed if the speed of the host vehicle increases beyond the first threshold speed based on the acceleration to be greater than or equal to the second threshold speed within a predetermined time, and
   wherein the setting the transmit power is further based on the first threshold speed if the speed of the host vehicle has not reached the second threshold speed within the predetermined time after continuing to accelerate beyond the first threshold speed;
   wherein the predetermined time is a time at which the second threshold speed is predicted by the host vehicle to be achieved based on the acceleration from the first threshold speed.

2. The method of claim 1, wherein increasing the transmit power increases a communication range of the device and decreasing the transmit power decreases the communication range of the device.

3. The method of claim 1, wherein the setting the transmit power comprises:
   increasing the transmit power if the speed of the host vehicle increases; and
   decreasing the transmit power if the speed of the host vehicle decreases.

4. The method of claim 1, wherein the setting the transmit power comprises:
   increasing the transmit power if the speed of the host vehicle is above a nominal speed; and
   decreasing the transmit power if the speed of the host vehicle is below the nominal speed.

5. The method of claim 4, wherein the nominal speed is based on a speed limit associated with the host vehicle for a certain region of a road where the host vehicle is present.

6. The method of claim 1, wherein an overriding factor exists when the priority level is at or above a threshold level.

7. The method of claim 1, wherein the setting the transmit power comprises:
   setting the transmit power to a high power if the priority level is at or above a threshold level; and
   setting the transmit power to the nominal power if the priority level is below the threshold level.

8. The method of claim 7, wherein the priority level of the host vehicle is determined further based on a type of the host vehicle.

9. The method of claim 8, wherein the priority level of the host vehicle is determined to be above the threshold level if at least one of a first condition, a second condition, or a third condition is satisfied, and
   wherein the first condition is that the type of the host vehicle is a high priority vehicle type, the second condition is that a mission of the host vehicle is a high priority mission, and the third condition is that the threat level of the host vehicle is a high threat level.

10. The method of claim 9, wherein the high priority vehicle type includes at least one of an emergency vehicle, a police vehicle, or a public transportation vehicle.

11. The method of claim 7, wherein the determining the one or more parameters further comprises: determining the priority level of the host vehicle based on at least one of a type of the host vehicle, a mission of the host vehicle, or a threat level of the host vehicle to at least one of another vehicle or a person;
   wherein the priority level of the host vehicle is determined to be above the threshold level if at least one of a first condition, a second condition, or a third condition is satisfied, and wherein the first condition is that the type of the host vehicle is a high priority vehicle type, the second condition is that the mission of the host vehicle is a high priority mission, and the third condition is that the threat level of the host vehicle is a high threat level; and
   wherein the priority level of the host vehicle is determined to be above the threshold level when at least the third condition is satisfied, and wherein the threat level is the high threat level when at least one of a first threat condition or a second threat condition is satisfied, wherein the first threat condition is that the host vehicle is traveling in an opposite direction to a direction of a travel lane and the second threat condition is that the host vehicle is determined to be a stolen vehicle.

12. The method of claim 1, wherein the wireless communication is at least one of device-to-device communication or vehicle-to-vehicle communication.

13. The method of claim 1, wherein the priority level of the host vehicle is determined based on a threat level of the host vehicle to at least one of another vehicle or a person.

14. The method of claim 1, wherein setting the transmit power comprises:
   determining whether an overriding factor exists, and
   increasing the transmit power beyond a nominal power when a channel used to transmit the message is at a busy level and if the overriding factor exists or refraining from increasing the transmit power to a power greater than the nominal power if the channel used to transmit the message is at the busy level and if the overriding factor does not exist.

15. A device for managing transmit power for wireless communication, comprising:
   a memory; and
   at least one processor coupled to the memory and configured to:
      determine one or more parameters associated with a host vehicle including the device, the one or more parameters including a speed of the host vehicle and a priority level of the host vehicle;
      set a transmit power of the device based on the determined speed and priority level of the host vehicle; and
      transmit a message via wireless communication using the set transmit power;
      wherein the speed of the host vehicle is determined based on an acceleration of the host vehicle;
      wherein the setting the transmit power is further based on a first threshold speed if the speed of the host vehicle increases based on the acceleration to be greater than or equal to the first threshold speed and less than a second threshold speed, the second threshold speed being greater than the first threshold speed;
      wherein the setting the transmit power is further based on the second threshold speed if the speed of the host vehicle increases beyond the first threshold speed based on the acceleration to be greater than or equal to the second threshold speed within a predetermined time, and
      wherein the setting the transmit power is further based on the first threshold speed if the speed of the host vehicle has not reached the second threshold speed within the predetermined time after continuing to accelerate beyond the first threshold speed;
      wherein the predetermined time is a time at which the second threshold speed is predicted by the host vehicle to be achieved based on the acceleration from the first threshold speed.

16. The device of claim 15, wherein the at least one processor configured to set the transmit power is configured to:
   increase the transmit power if the speed of the host vehicle increases; and
   decrease the transmit power if the speed of the host vehicle decreases.

17. The device of claim 15, wherein the at least one processor configured to set the transmit power is configured to:
   increase the transmit power if the speed of the host vehicle is above a nominal speed; and
   decrease the transmit power if the speed of the host vehicle is below the nominal speed.

18. The device of claim 15, wherein an overriding factor exists when the priority level is at or above a threshold level.

19. The device of claim 15, wherein the at least one processor configured to set the transmit power is configured to:
   set the transmit power to a high power if the priority level is at or above a threshold level; and
   set the transmit power to the nominal power if the priority level is below the threshold level.

20. The device of claim 19, wherein the at least one processor is further configured to:
   determine the priority level of the host vehicle further based on a type of the host vehicle.

21. A device for managing transmit power for wireless communication, comprising:
   means for determining one or more parameters associated with a host vehicle including the device, the one or more parameters including a speed of the host vehicle and a priority level of the host vehicle;
   means for setting a transmit power of the device based on the determined speed and priority level of the host vehicle; and
   means for transmitting a message via wireless communication using the set transmit power;
   wherein the speed of the host vehicle is determined based on an acceleration of the host vehicle;
   wherein the setting the transmit power is further based on a first threshold speed if the speed of the host vehicle increases based on the acceleration to be greater than or equal to the first threshold speed and less than a second threshold speed, the second threshold speed being greater than the first threshold speed;
   wherein the setting the transmit power is further based on the second threshold speed if the speed of the host vehicle increases beyond the first threshold speed based on the acceleration to be greater than or equal to the second threshold speed within a predetermined time, and wherein the setting the transmit power is further based on the first threshold speed if the speed of the host vehicle has not reached the second threshold speed within the predetermined time after continuing to accelerate beyond the first threshold speed;

wherein the predetermined time is a time at which the second threshold speed is predicted by the host vehicle to be achieved based on the acceleration from the first threshold speed.

22. The device of claim 21, wherein increasing the transmit power increases a communication range of the device and decreasing the transmit power decreases the communication range of the device.

23. The device of claim 21, wherein the means for setting the transmit power is configured to:

increase the transmit power if the speed of the host vehicle increases; and decrease the transmit power if the speed of the host vehicle decreases.

24. A non-transitory computer-readable medium storing computer executable code for a device, comprising code to:

determine one or more parameters associated with a host vehicle including the device, the one or more parameters including a speed of the host vehicle and a priority level of the host vehicle;

set a transmit power of the device based on the determined speed and priority level of the host vehicle; and transmit a message via wireless communication using the set transmit power;

wherein the speed of the host vehicle is determined based on an acceleration of the host vehicle;

wherein the setting the transmit power is further based on a first threshold speed if the speed of the host vehicle increases based on the acceleration to be greater than or equal to the first threshold speed and less than a second threshold speed, the second threshold speed being greater than the first threshold speed;

wherein the setting the transmit power is further based on the second threshold speed if the speed of the host vehicle increases beyond the first threshold speed based on the acceleration to be greater than or equal to the second threshold speed within a predetermined time, and wherein the setting the transmit power is further based on the first threshold speed if the speed of the host vehicle has not reached the second threshold speed within the predetermined time after continuing to accelerate beyond the first threshold speed;

wherein the predetermined time is a time at which the second threshold speed is predicted by the host vehicle to be achieved based on the acceleration from the first threshold speed.

* * * * *